Sept. 1, 1953  H. MACKIE  2,650,605
PRESSURE REGULATING DEVICE
Filed Nov. 8, 1948  2 Sheets-Sheet 1

Inventor:
Harry Mackie;
By his attorneys,
Baldwin, Wight, + Prevost

Sept. 1, 1953     H. MACKIE     2,650,605
PRESSURE REGULATING DEVICE

Filed Nov. 8, 1948     2 Sheets-Sheet 2

Inventor:
Harry Mackie;
By his attorneys,
Baldwin, Wight & Prevost

Patented Sept. 1, 1953

2,650,605

UNITED STATES PATENT OFFICE 2,650,605

PRESSURE REGULATING DEVICE

Harry Mackie, Leigh, England, assignor to Electro-Hydraulics Limited, Warrington, England, a company of Great Britain Application November 8, 1948, Serial No. 58,923
In Great Britain November 18, 1947

3 Claims. (Cl. 137—102)

This invention relates to pressure regulating devices for use in hydraulic or pneumatic systems, said devices being of the kind comprising a member which, when the fluid pressure fed to the system by a pump or compressor reaches a pre-determined value, moves to permit said fluid to escape to a tank or to atmosphere. This type of device enables the pump to idle when members of the system are not required to work or to work only under light load and consequently lengthens the life of the pump.

In this known type of device it has been proposed to provide a piston with two valves, one at each end of the piston rod which passes through the piston, which piston slides in a cylinder bore and is subjected to the action of a spring which surrounds the piston rod so that the valves are alternately moved to close two orifices controlling the supply and exhaust ports of the cylinder.

One object of the present invention is to provide an improved form and construction of a pressure regulating device of the above type which will be relatively simple and capable of maintaining the pressure in an hydraulic or pneumatic system within predetermined limits, another object being to provide a pressure regulating device which is easy to adjust without dismantling.

A pressure regulating device of the type described according to the present invention comprises a piston, having two valves, one at each end of said piston, which is arranged to reciprocate within a cylinder and is subjected to bias so that the valves alternately close two orifices in said cylinder, a housing adjustable axially with respect to the cylinder and a support adjustable axially in said housing, the support providing a bearing for the biassing means.

The means for imparting bias to the piston may comprise one or more springs, whilst the axial adjustment of the housing and support is preferably attained by screw-threaded connections, one between the housing and the cylinder and one between the housing and the support.

Figure 1:
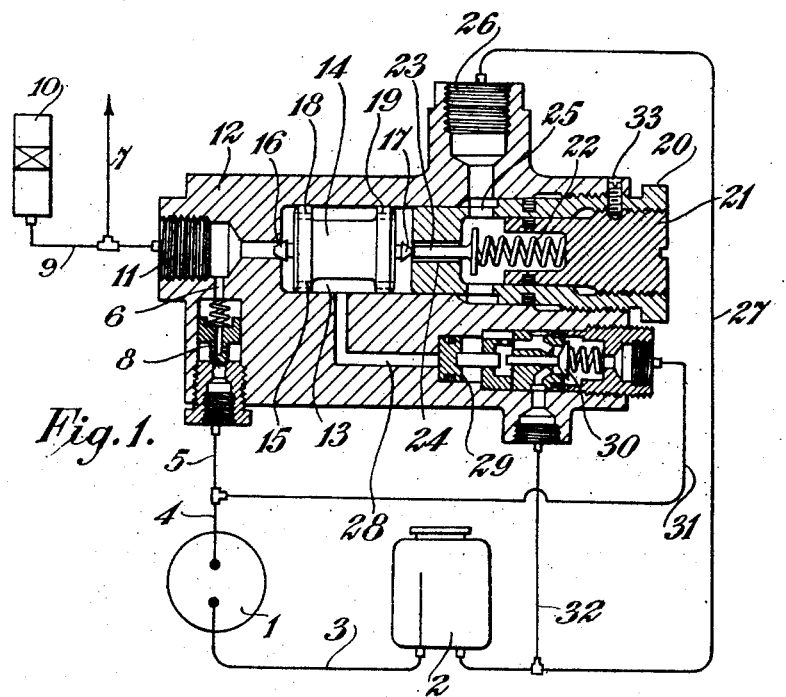
Figure 2:
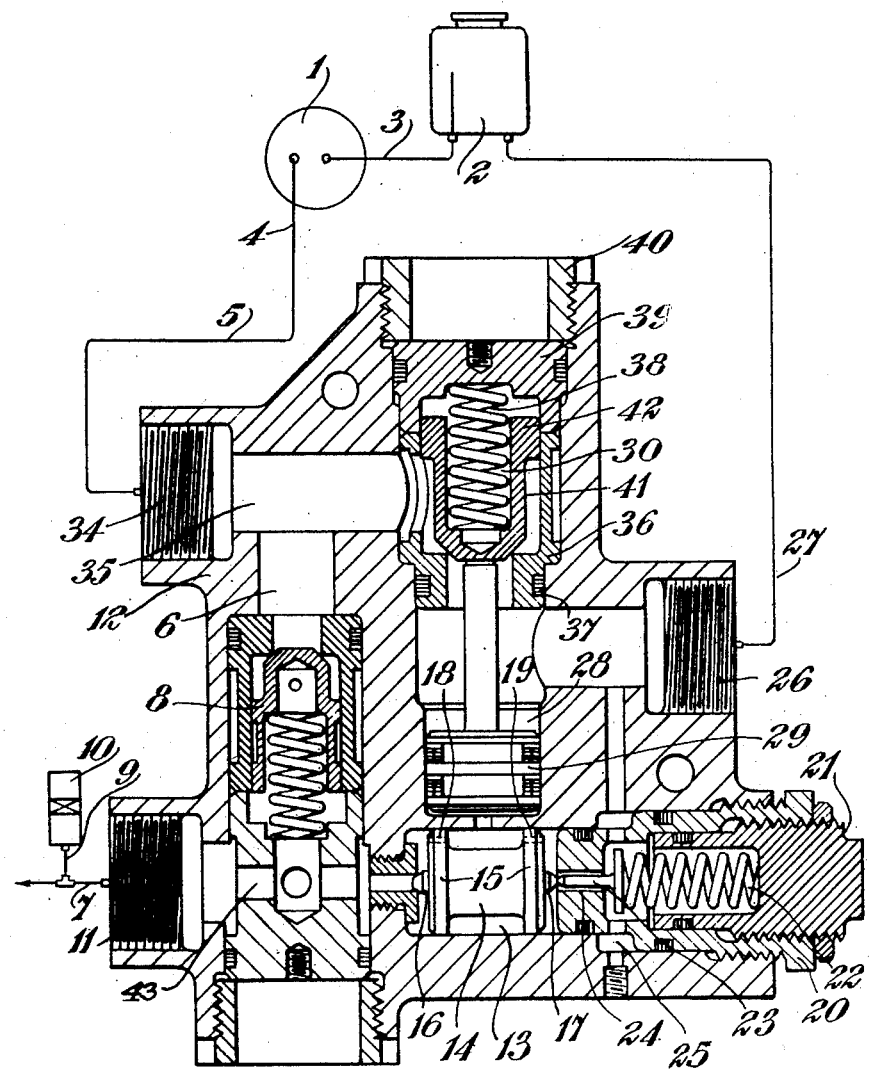

The invention is diagrammatically illustrated in the accompanying drawings in which Figure 1 shows one form and Figure 2 a modified form to a larger scale, like parts being given like reference numbers.

Referring to Figure 1 the pressure system comprises a pump 1 which is connected by a pipe line 3 with a fluid tank or reservoir 2 and is arranged to deliver fluid into the system through lines 4, 5, 6 and 7 and a non-return valve 8 on the delivery side of which is a branch line 9 leading to a pressure accumulator 10; also on the delivery side of said valve 8 is a connection 11 of a pressure regulating device. The said device comprises a cylinder or body 12 in the bore 13 of which is adapted to reciprocate a piston 14, the major portion of the length of which is of reduced diameter, leaving two portions 15, one at either end of the full diameter of the cylinder bore. The piston carries at each end a valve 16, 17 and is ported in both flanged extremities as at 18, 19. In threaded engagement with the cylinder 12 and arranged to enter the bore 13 thereof behind the piston 14 is a housing 20 which is internally threaded to receive adjustably a spring support 21. This support 21 forms a bearing for one end of a coiled spring 22, the other end of which is adapted to bear against a spindle 23 forming part of, or in engagement with, the valve 17, the spindle 23 passing through the inner end of the spring housing 20, the spindle being cylindrical and provided with milled flats to allow the passage of fluid through the bore or passage 24 in the spring housing through which the spindle passes. The housing is also provided with ports 25 which communicate with the outlet 26 from the cylinder which is connected by line 27 to the fluid tank 2. It will be appreciated that adjustment of the spring action on the piston 14 can be obtained by relative axial movement between the cylinder 12 and housing 20 and also between the housing 20 and spring support 21. In that portion of the cylinder 12 in which the piston 14 reciprocates, which may be called a valve chamber, is a bore 28, at right angles to the axis of the piston, in which bore a plunger 29 is provided which is in mechanical connection with a by-pass lock valve 30 arranged in a by-pass chamber or passage in the body 12 to which there are connected a branch pipe 31 from the pump connection 4, 5 to the non-return valve 8 and a branch pipe 32 which passes back to the fluid tank 2.

Means such as a locking screw 33 is preferably provided for locking the housing and spring support to the cylinder body. Said means may, however, comprise any other known locking device, for example, the locking device shown and described in British Patent 547,634, of September 4, 1942.

The system works as follows:

Fluid under pressure from the pump 1 passes through the non-return valve 8 into the system to do the required work, the accumulator 10 acting as a pressure equaliser in known manner.

Due to the bias urged on the piston 14 by the spring 22, the piston is moved so that the valve 16 controlling the supply of fluid to the pressure regulating device is closed until a predetermined pressure is reached. If this pre-determined pressure is exceeded, fluid pressure will force the valve 16 off its seating and move the piston 14 against the spring bias so that the pressure fluid enters the bore 13 of the cylinder and acts on the larger area of the piston allowing a small amount to pass through the ports 18, 19 in the piston, so that the valve 17 on the other end of the piston is pressed onto its seating. Any fluid which, before closing of the valve 17, exists in the housing 20 is returned through the ports 25 therein, via the cylinder outlet 26 and pipe line 27 to the tank 2 or to atmosphere if the system is pneumatically functioning. At the same time the fluid pressure existing in the cylinder will move the plunger 29 to open the lock valve 30 so that fluid will now pass from the pump 1 mainly into the branch line 32 and back to the tank 2. The system is thus relieved from excess fluid pressure when it exceeds a predetermined value. Should the pressure of the fluid in the system fall below another pre-determined pressure the spring bias on the piston 14 comes into play to close the valve 16 and cut the supply of fluid to the cylinder of the pressure regulating device and fluid is again delivered into the system through the normal lines. The value of the pressure for the "cut-out" and "cut-in" of the pressure regulating device can be pre-determined by the areas of the valve seats of the valves 16, 17, or by altering the characteristics of the biassing spring. During all these operations the accumulator 10 will tend to equalise the rise or fall of pressure.

It will be appreciated that the travel of the piston 14 and therefore the valves 16, 17, carried thereby, can be adjusted in two ways, that is to say by axial movement of the spring support 21 within the housing 20, and by axial movement of the housing 20 in the cylinder 12 both of which adjustments can be made externally of the pressure regulating device; thus a highly sensitive pressure regulating device is obtained.

It will further be appreciated that as only a part of the fluid under pressure passes through the pressure regulating device as distinct from the whole of the pressure fluid as in known valve arrangements, the device according to the present invention can be small in size and light in weight.

Another form of the invention is illustrated in Figure 2 in which parts similar to those in Figure 1 are indicated by the same reference numeral.

In this arrangement, the cylinder 12 has a fluid connection at 34 communicating with the pump 1, which connection leads through an aperture 35 to the pipe 6 and non-return valve 8 and to the lock or bypass valve indicated generally at 30. This valve comprises a valve sleeve 36 with its sealing ring 37 held in position by a spring support 39 which is retained by a nut 40, the support forming a bearing for a spring 38. In the bore of the sleeve 36 and spring support 39 slides the valve 41 which is biassed to the closed position by the spring 38, the valve being formed with a shoulder 42.

The system works as follows:

Fluid under pressure coming from pump 1 passes through the lines 4 and 5 into the connection 34, then through aperture 35, the non-return valve 8, into an aperture 43 and through the connection 11 and pipe line 7 into the system. Fluid pressure will act on the shoulder 42 of the valve 41 but will not be able to move the valve against the force of its spring due to the small area it acts upon. Pressure fluid will be able to pass through aperture 43 into the cut out valve part of the body and act on the valve 16 in a similar way as described in connection with Figure 1. If a predetermined fluid pressure is exceeded, fluid will pass through bore 13 into bore 28 and act on the plunger 29 moving it upwards and carrying the valve 41 with it. Fluid under pressure entering aperture 35 will now pass the valve 41 into connection 26 and return by the pipe line 27 into tank 2, and the drop in the pressure will close the non-return valve 8. After a pre-determined fall in pressure, the force of the spring 22 will return the valve 16 onto its seat. When this valve is thus held on its seat, the force of spring 38 will be able to move the valve 41 onto its seat, carrying the plunger 29 with it.

The plunger 29 instead of acting directly on the lock valve 30 could be employed to operate any other known means of relieving the fluid pressure, for example a clutch to declutch the pump, or a switch to interrupt the electric current to an electric motor driving the pump. In this latter case the plunger may be arranged in mechanical connection with one or more switches to allow the making or breaking of electrical contacts when the pressure in the system exceeds or drops below a predetermined value.

It will also be appreciated that the provision of a plunger is not essential, since fluid pressure in the bore 28 can be utilised to operate the lock valve directly. Again, if a plunger be used it can be arranged to operate the lock valve and an electric switch simultaneously.

What I claim is:

1. A pressure regulating device of the character described comprising a cylinder having a bore, a valve chamber in said bore, a piston reciprocable in said chamber, a first valve seat in one end of said chamber, a first valve element carried by said piston and cooperable with said first valve seat, a first passage for conducting fluid under pressure to said first valve seat, a second valve seat in the opposite end of said chamber, a second valve element carried by said piston and cooperable with said second valve seat, a second passage for the escape of fluid from said chamber past said second valve seat, said valve elements being alternatively movable to seated position by movement of said piston, a third passage communicating with said chamber intermediate said valve seats for passing fluid to and from pressure operative means, said pressure operative means being operatively connected to a lock valve controlling discharge of pressure fluid through a by-pass chamber to an exhaust line and comprising a plunger responsive to pressure in said third passage for opening said lock valve, a housing axially adjustable in said bore and carrying said second valve seat, said housing having means therein for biasing said piston to normally maintain said first valve element seated and said second valve element unseated, and a support for said biasing means mounted in said housing, said support being axially adjustable in said housing, and said housing and support together sealing said bore.

2. A pressure regulating device of the character described comprising a cylinder having a bore, a valve chamber in said bore, a piston reciprocable in said chamber and having spaced annular end flanges slidably engaging the walls of said chamber, a first valve seat in one end of said chamber, a first valve element carried by said piston and cooperable with said first valve seat, a first passage for conducting fluid under pressure to said first valve seat, a second valve seat in the opposite end of said chamber, a second valve element carried by said piston and cooperable with said second valve seat, a second passage for the escape of fluid from said chamber past said second valve seat, said valve elements being alternatively movable to seated position by movement of said piston, a third passage communicating with said chamber intermediate said valve seats for passing fluid to and from pressure operative means, said piston having means permitting only restricted communication between said third passage and that one of said first and second passages which is not closed by one of said valve elements, a housing axially adjustable in said bore and carrying said second valve seat, said housing having means therein for biasing said piston to normally maintain said first valve element seated and said second valve element unseated, and a support for said biasing means mounted in said housing, said support being axially adjustable in said housing, and said housing and support together sealing said bore.

3. A device as claimed in claim 2 in which said piston is provided with a port through each of said end flanges to permit said restricted communication.

HARRY MACKIE.

References Cited in the file of this patent

UNITED STATES PATENTS

| Number | Name | Date |
|---|---|---|
| 1,003,848 | Wood | Sept. 19, 1911 |
| 1,138,278 | Castle | May 4, 1915 |
| 1,682,848 | Moody | Sept. 4, 1928 |
| 1,771,879 | Dowd | July 29, 1930 |
| 2,191,726 | Peters | Feb. 27, 1940 |
| 2,447,820 | Schultz | Aug. 24, 1948 |
| 2,474,122 | Schneck | June 21, 1949 |